(12) United States Patent
Ogura

(10) Patent No.: US 8,072,097 B2
(45) Date of Patent: Dec. 6, 2011

(54) POWER SUPPLY APPARATUS AND VOLTAGE MONITORING METHOD

(75) Inventor: Yoshinari Ogura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/662,531

(22) Filed: Apr. 21, 2010

(65) Prior Publication Data

US 2010/0201193 A1    Aug. 12, 2010

Related U.S. Application Data

(63) Continuation of application No. PCT/JP2007/070817, filed on Oct. 25, 2007.

(51) Int. Cl.
*H02J 1/10* (2006.01)
(52) U.S. Cl. .................. 307/75; 307/31; 307/39
(58) Field of Classification Search .......... 307/31, 307/39, 75
See application file for complete search history.

(56) References Cited

U.S. PATENT DOCUMENTS

| | | | | |
|---|---|---|---|---|
| 6,031,362 | A * | 2/2000 | Bradley | 323/269 |
| 6,289,467 | B1 | 9/2001 | Lewis et al. | |
| 7,394,445 | B2 * | 7/2008 | Chapuis et al. | 345/89 |
| 7,466,038 | B2 * | 12/2008 | Gaudreau et al. | 307/82 |
| 7,498,693 | B2 * | 3/2009 | Gaudreau et al. | 307/82 |
| 7,498,695 | B2 * | 3/2009 | Gaudreau et al. | 307/82 |
| 7,836,322 | B2 * | 11/2010 | Chapuis et al. | 713/340 |

FOREIGN PATENT DOCUMENTS

| | | |
|---|---|---|
| JP | 58-116067 | 7/1983 |
| JP | 58-116067 A | 7/1983 |
| JP | 2-87722 | 3/1990 |
| JP | 2-87722 A | 3/1990 |
| JP | 8-5693 | 1/1996 |
| JP | 8-328673 | 12/1996 |
| JP | 8-328673 A | 12/1996 |
| JP | 11-55865 | 2/1999 |
| JP | 11-55865 A | 2/1999 |
| JP | 2003-217681 | 7/2003 |
| JP | 2003-217681 A | 7/2003 |
| JP | 2006-209486 | 8/2006 |
| JP | 2006-209486 A | 8/2006 |

OTHER PUBLICATIONS

International Search Report for PCT/JP2007/070817, mailed on Jan. 15, 2008.
International Search Report dated Jan. 15, 2008 and issued in corresponding International Patent Application PCT/JP2007/070817.

\* cited by examiner

*Primary Examiner* — Jared Fureman
*Assistant Examiner* — Adi Amrany
(74) *Attorney, Agent, or Firm* — Fujitsu Patent Center

(57) ABSTRACT

Output voltages of regulators are supplied to each load device and input to a representing-value decision logic circuit that is operated by a dedicated resident power supply. The representing-value decision logic circuit selects an output voltage that appears the most irregular of all output voltages from the regulators, and then sends a selection result to a selector. The selector selects only the output voltage from a regulator that outputs the output voltage that appears the most irregular and is selected by the representing-value decision logic circuit and then outputs the output voltage to a smoothing circuit. The direct current that has been smoothed by the smoothing circuit is quantized by an AD converter and then received by a system monitoring processor.

14 Claims, 9 Drawing Sheets

POWER SUPPLY APPARATUS AND VOLTAGE MONITORING METHOD

CROSS-REFERENCE TO RELATED APPLICATION

This application is a continuation of International Application No. PCT/JP2007/070817, filed on Oct. 25, 2007, the entire contents of which are incorporated herein by reference.

FIELD

The embodiments discussed herein are directed to a power supply apparatus and a voltage monitoring method.

BACKGROUND

Conventionally, in an electric apparatus that contains a secondary power supply using a DC-DC (Direct Current to Direct Current) converter, the integrated circuit of the DC-DC converter is often replaced by a plurality of regulators (constant direct current power supply circuits) to reduce costs. In this case, it is difficult to realize power supply by connecting to the output of a plurality of regulators for each one of them. Generally, power supply is realized by using regulators each of which is dedicated to a plurality of power supply areas (e.g., an LSI (Large Scale Integration) as a load device).

Because regulators are inexpensive and provide a low failure rate, replacing a DC-DC converter with a plurality of regulators may reduce the production costs of a power supply apparatus. In contrast, when a plurality of regulators is used, each output voltage of regulators needs to be regularly monitored because the output voltage is different for each regulator.

For example, Patent Document 1 discloses a power supply monitoring apparatus that reads output voltage of each regulator with an ADC (Analog Digital Converter) and gives out a warning when output voltage is below or above a reference value.

Further, Patent Document 2 discloses a power supply apparatus that monitors a plurality of power supplies and stops a power supply by outputting a signal to shut down the power supply where an error of output voltage is detected.

When a conventional configuration of a power supply monitoring apparatus in which one system monitoring processor (SPV: Service Processor) monitors output voltage by one ADC reading the output voltage of one DC-DC converter is changed into a configuration where one DC-DC converter is replaced by a plurality of regulators, the system-monitoring processor firmware needs to be substantially changed when the conventional technology notably disclosed in Patent Documents 1 or 2 is used. Thus, a problem of incompatibility arises in that the power supply apparatus including a power supply monitoring apparatus ends up incurring rather higher production costs because there is no compatibility with the configuration of a conventional power supply monitoring apparatus.

[Patent Document 1] Japanese Laid-open Patent Publication No. 08-005693
[Patent Document 2] U.S. Pat. No. 6,289,467

SUMMARY

According to an aspect of an embodiment of the invention, a power supply apparatus, includes a primary power supply that outputs direct current; a plurality of secondary power supplies to each of which the direct current is input and a load device is connected; a selector to which output voltages of the secondary power supplies are input and selects one of the output voltages of the secondary power supplies; and a converter that converts the output voltage selected by the selector into quantized voltage information.

According to another aspect of an embodiment of the invention, a power supply apparatus, includes a primary power supply that outputs direct current; a plurality of secondary power supplies to each of which the direct current is input and a load device is connected; a plurality of difference voltage detectors to which output voltages of the secondary power supplies and reference voltages are input and which output absolute values of difference voltages between the output voltages of the secondary power supplies and the reference voltages for each of the secondary power supplies; a plurality of comparators that compare the absolute values of the difference voltages that are output from the difference voltage detectors with each other; a selector that selects, based on comparison results of the comparators, the output voltage of the secondary power supply whose difference in the absolute value from the reference voltage is the highest of all output voltages of the secondary power supplies; and a converter that converts the output voltage selected by the selector into quantized voltage information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings.

Figure 1:
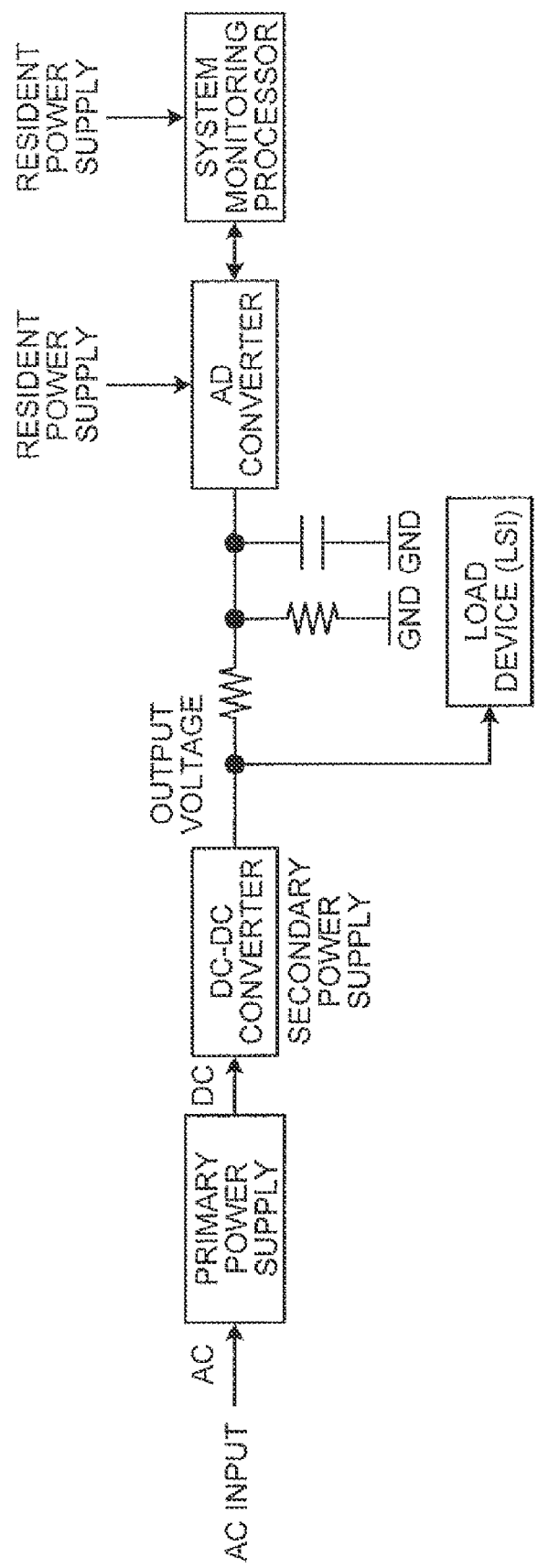
FIG. 1 is a block diagram of a schematic configuration of a conventional power supply apparatus and a voltage monitoring circuit.

Firstly, a schematic configuration of a conventional power supply apparatus and a conventional voltage monitoring circuit is described. FIG. 1 is a block diagram illustrating a schematic configuration of a conventional power supply apparatus and a voltage monitoring circuit. As illustrated in FIG. 1, conventionally, AC current (Alternating Current) input is converted into DC current (Direct Current) by a primary power supply. The DC current, after the conversion by the primary power supply, encounters voltage conversion by a secondary power supply including a DC-DC converter. The direct current of output voltage, after the voltage conversion by the DC-DC converter, is supplied to a load device such as an LSI (Large Scale Integration) and also to a voltage monitoring circuit for voltage monitoring. FIG. 1 illustrates a case where a single load device is connected.

Specifically, the circuit for voltage monitoring includes a smoothing circuit that includes a resistor and a capacitor that are grounded and connected in parallel with an output and generates direct current (or smoothes current) where pulsating current included in rectified current is removed; an AD (Analog to Digital) converter that quantizes (digitalizes) the direct current that has been smoothed by the smoothing circuit; and a system monitoring processor (SPV: Service Processor) that monitors the voltage value of the direct current that has been quantized by the AD converter. Further, power to the AD converter and the system monitoring processor may be supplied from each dedicated resident power supply or from a single dedicated resident power supply.

The resident power supply is a power supply that belongs to a different system from the primary power supply, so that the resident power supply may supply power regardless of the control of the primary power supply as long as the system is running.

With the configuration described above, the system monitoring processor may monitor problems with voltage supplied to a load device. When the system monitoring processor detects a problem with the voltage supplied to the load device, an appropriate measure may be taken.

Figure 2:
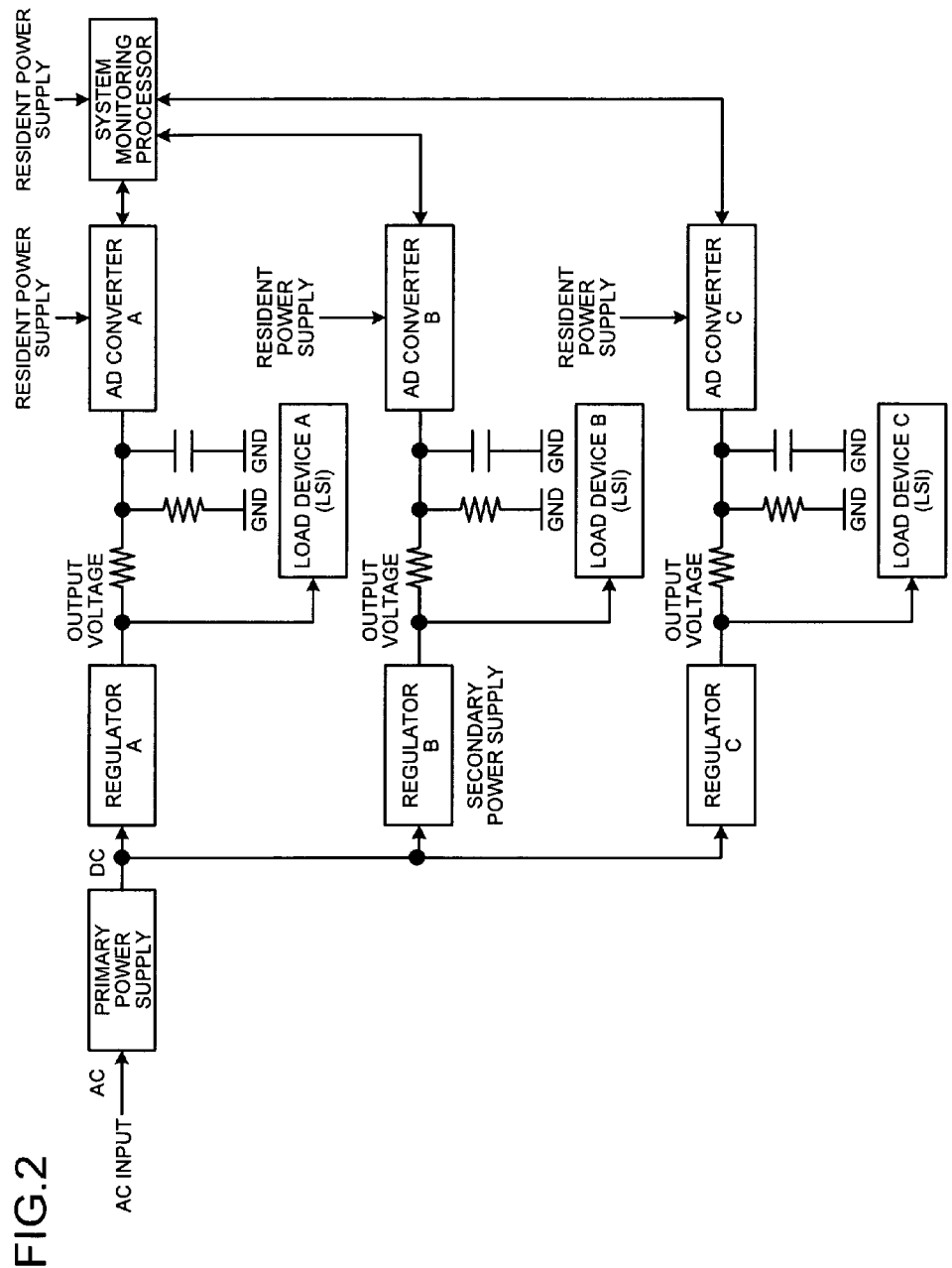
FIG. 2 is a block diagram illustrating a schematic configuration of a power supply apparatus and a voltage monitoring circuit where a secondary power supply is replaced by a plurality of regulators.

However, because a DC-DC converter including a converter (trans) and a switching circuit is expensive, a regulator (a constant direct current power supply circuit) is generally adopted instead of a DC-DC converter in order to reduce costs. A regulator is a voltage control device that may only lower voltage and is much more inexpensive than a DC-DC converter. FIG. 2 is a block diagram illustrating a schematic configuration of a power supply apparatus and a voltage monitoring circuit where a secondary power supply is replaced by a plurality of regulators. Although FIG. 2 illustrates a case where three regulators, connected to the load device, are also connected to the primary power supply, where the number of regulators is not limited to three.

As illustrated in FIG. 2, a regulator A that supplies direct-current power supply to a load device A, a regulator B that supplies direct-current power supply to a load device B, and a regulator C that supplies direct-current power supply carries out voltage conversion for each on the direct current that has been converted into direct current by the primary power supply and supplies direct current to each load device.

The regulators are connected straight with smoothing circuits that smoothes output voltage of the regulators and AD converters, respectively. Specifically, the regulator A is connected to the AD converter A, the regulator B is connected to the AD converter B, and the regulator C is connected straight with the AD converter C along with each smoothing circuit.

The output voltage of the regulator A that has been quantized by the AD converter A, output voltage of the regulator B that has been quantized by the AD converter, and output voltage of the regulator A that has been quantized by the AD converter are input to a single system monitoring processor. Thus, a single system monitoring processor monitors the output voltage of all regulators. Further, power to the AD converter A, the AD converter B, the AD converter C, and the system monitoring processor may be supplied from each dedicated resident power supply or from a single resident power supply.

With the configuration illustrated in FIG. 2, an AD converter needs to be prepared for each regulator. Thus, the circuit for voltage monitoring needs to be redesigned. However, when the circuit for voltage monitoring is redesigned, the system monitoring processor firmware needs to be revised. Thus, the circuit for voltage monitoring becomes incompatible with the conventional configuration, which causes a problem in terms of production cost.

Figure 3:
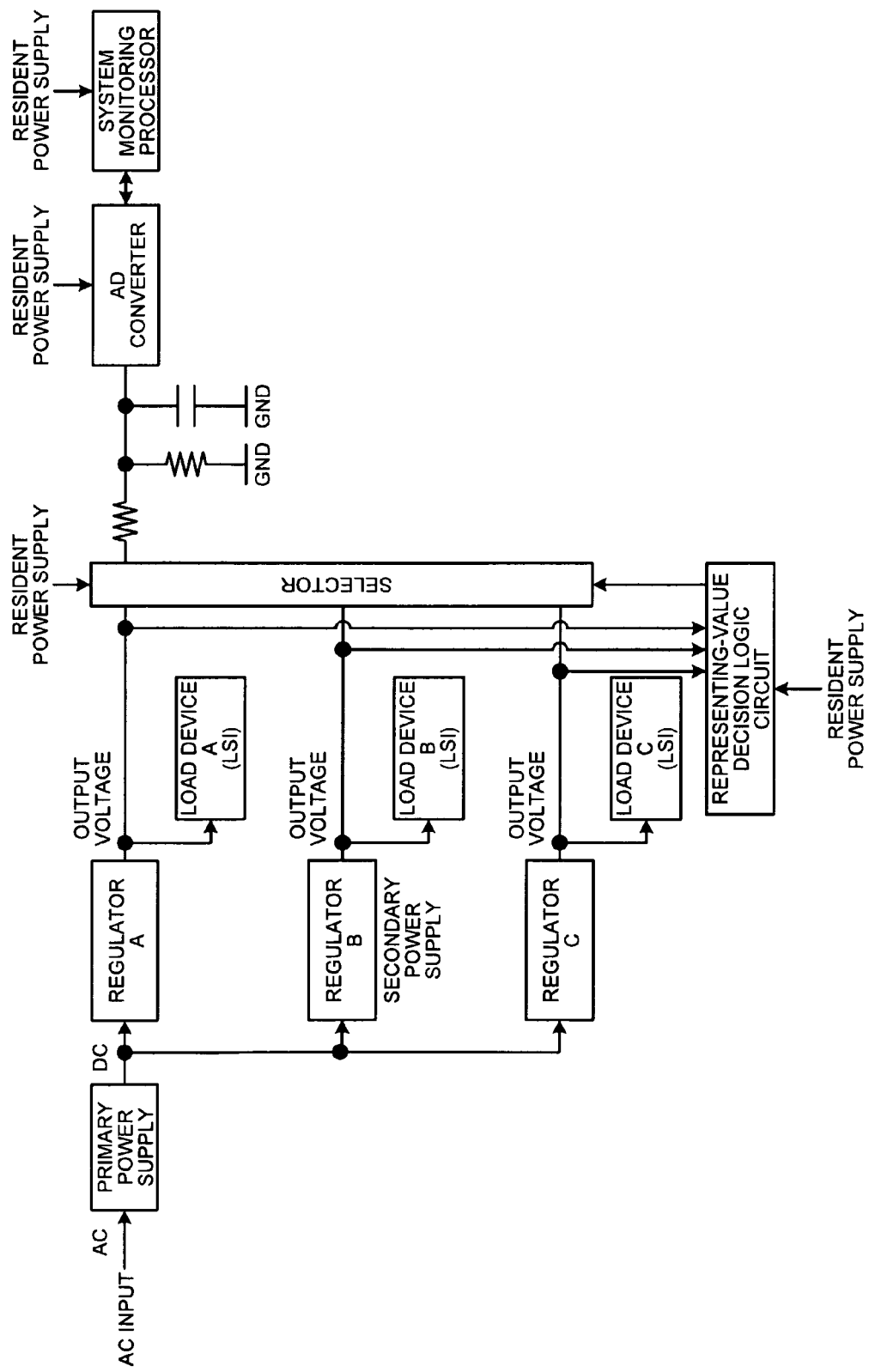
FIG. 3 is a block diagram illustrating a schematic configuration of a power supply apparatus and a voltage monitoring circuit in accordance with an example of an embodiment where a secondary power supply is replaced by a plurality of regulators.

The present embodiment provides a power supply apparatus with which it is not needed to change conventional configurations of the AD converter and the system monitoring processor nor revise the system monitoring processor firmware, and compatibility with the conventional configuration may still be maintained. FIG. 3 is a block diagram illustrating a schematic configuration of a power supply apparatus and a voltage monitoring circuit where a secondary power supply is replaced by a plurality of regulators. Although FIG. 3 illustrates a case where three regulators, connected to the load devices, are also connected to the primary power supply, where the number of regulators is not limited to three.

In FIG. 3, output voltage of the regulator A, the regulator B, and the regulator C is supplied to the load devices, respectively, and to a representing-value decision logic circuit that is operated by a dedicated power supply. The representing-value decision logic circuit selects the output voltage that seems the most irregular of all the output voltages of the regulator A, the regulator B, and the regulator C and then sends a selection result to a selector.

The selector selects only the output voltage from the regulator that outputs the output voltage that seems the most irregular of all and is selected by the representing-value decision logic circuit, and then the selector inputs the output voltage to the smoothing circuit. The direct current that has been smoothed by the smoothing circuit is quantized by the AD converter and then sent to the system monitoring processor.

With the configuration in FIG. 3, a single output voltage is input via the selector to the smoothing circuit. The direct current that has been smoothed by the smoothing circuit is quantized by the AD converter and then sent to the system monitoring processor. The circuit used for voltage monitoring that includes the smoothing circuit, the AD converter, and the system monitoring processor may be the same as that in the conventional configuration in FIG. 1.

With the configuration in FIG. 3, it is not needed to prepare an AD converter for each regulator nor redesign the circuit for voltage monitoring after the smoothing circuit. Thus, it is also not needed to revise the system monitoring processor firmware. The configuration in FIG. 3 is preferable because the circuit for voltage monitoring remains compatible with the conventional configuration.

Figure 4:
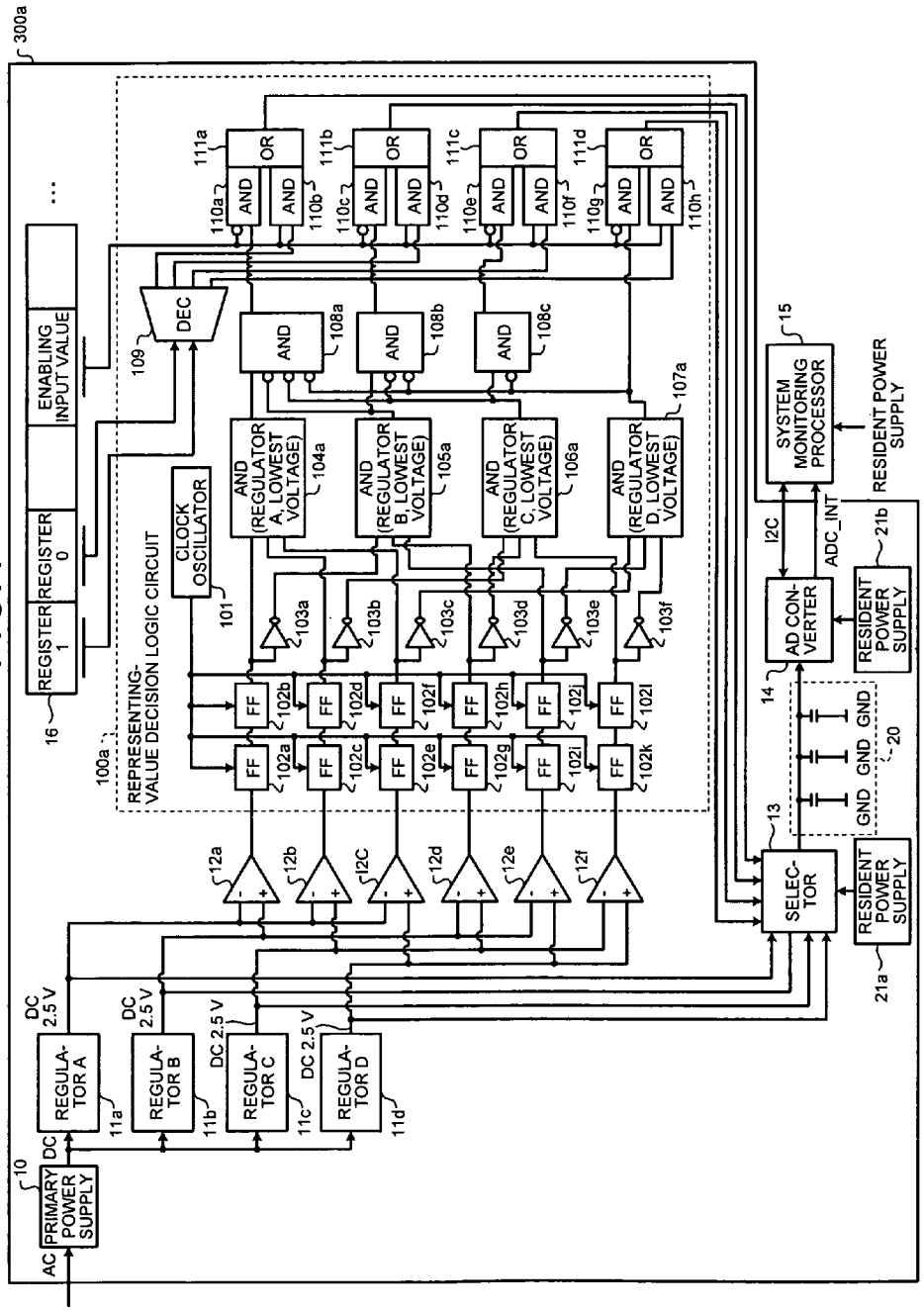
FIG. 4 is a block diagram illustrating a detailed configuration of a power supply apparatus and a voltage monitoring circuit in accordance with an example of a first embodiment where a secondary power supply is replaced by a plurality of regulators.

A detailed configuration of a power supply apparatus and a voltage monitoring circuit in accordance with an example of the first embodiment where a secondary power supply is replaced by a plurality of regulators is described below. FIG. 4 is a block diagram illustrating a detailed configuration of a power supply apparatus and a voltage monitoring circuit in accordance with an example of the first embodiment where a secondary power supply is replaced by a plurality of regulators. Although FIG. 4 illustrates a case where four regulators are connected, where the number of regulators is not limited to four. Further, in FIG. 4, illustration of load devices connected to regulators is omitted.

An outline of the first embodiment is described below. In the power supply apparatus, a secondary power supply, which is a 2.5-V power supply, includes four regulators, and the four regulators output a 2.5 V voltage on the basis of an input voltage and a power-supply activation instruction signal (not illustrated). The values of voltages output from the four regulators are compared by a comparator circuit. Based on a comparison result, the representing-value decision logic circuit selects a regulator that outputs the lowest voltage value.

A power supply apparatus 300a includes a primary power supply 10, a regulator A 11a, a regulator B 11b, a regulator C 11c, and a regulator D 11d, six comparators 12a to 12f, a representing-value decision logic circuit 100a, a selector 13, an AD converter 14, a general-purpose input/output (GPIO) interface 16, a smoothing circuit 20, a resident power supply 21a that supplies power to the selector 13, and a resident power supply 21b that supplies power to the AD converter 14. The resident power supply 21a and the resident power supply 21b may be integrated into one.

The primary power supply 10 converts the AC current input into the DC current and then supplies the DC current to the regulator A 11a, the regulator B 11b, the regulator B 11b, the regulator C 11c, and the regulator D 11d. The regulator A 11a, the regulator B 11b, the regulator C 11c, and the regulator D 11d convert each voltage of DC current supplied from the primary power supply 10 into 2.5 V. The voltage of the DC current, which has been converted into 2.5 V, is referred to, hereinafter, as "output voltage".

The output voltage of the regulator A 11a is input to the inverting input terminals of the comparators 12a to 12c. Further, the output voltage of the regulator B 11b is input to a non-inverting input terminal of the comparator 12a, a non-inverting input terminal of the comparator 12d, and a non-inverting input terminal of the comparator 12e.

The output voltage of the regulator C 11c is input to a non-inverting terminal of the comparator 12b, a non-inverting terminal of the comparator 12d, and a non-inverting terminal of the comparator 12f. Further, the output voltage of the regulator D 11d is input to a non-inverting input terminal of the comparator 12c, a non-inverting input terminal of the comparator 12e, and a non-inverting input terminal of the comparator 12f.

The regulator A 11a, the regulator B 11b, the regulator C 11c, and the regulator D 11d supply output voltages to the comparators 12a to 12f and also to the selector 13.

The comparators 12a to 12f select higher one of input output voltages and input the selected one to the representing-value decision logic circuit 100a.

The selector 13 selects the regulator that outputs the lowest or highest output voltage of all input from the representing-value decision logic circuit 100a. The selector 13 thus selects the output voltage from the regulator and sends the output voltage to the smoothing circuit 20. The selector 13 is an analogue multiplexer or an analogue switch.

The output voltage that has been smoothed by the smoothing circuit 20 is converted by the AD converter 14 into quantized voltage information and sent to a system monitoring processor (SPV: Service Processor) 15. Based on the quantized voltage information, the system monitoring processor 15 may monitor output voltages of the regulator A 11a, the regulator B 11b, the regulator C 11c, and the regulator D 11d. The AD converter 14 and the system monitoring processor 15 have the same configuration as those conventional ones.

The representing-value decision logic circuit 100a includes, for example, a clock oscillator 101 that oscillates 100 kHz clocks, a flip-flop (storage circuit or FF) 102a and a flip-flop 102b, a flip-flop 102c and a flip-flop 102d, a flip-flop 102e and a flip-flop 102f, a flip-flop 102g and a flip-flop 102h, a flip-flop 102i and a flip-flop 102j, a flip-flop 102k and a flip-flop 102l, six inverters (logic inverting circuit) 103a to 103f, an AND gate (logical product circuit) 104a, an AND gate 105a, an AND gate 106a, and an AND gate 107a.

Further, the representing-value decision logic circuit 100a includes an AND gate 108a, an AND gate 108b, an AND gate 108c, a decoder 109, an AND gate 110a and an AND gate 110b, an AND gate 110c and an AND gate 110d, an AND gate 110e and an AND gate 110f, an AND gate 110g and an AND gate 110h, an OR gate (logical sum circuit) 111a that is connected with the AND gate 110c and the AND gate 110d, an OR gate 111b that is connected with the AND gate 110c and the AND gate 110d, an OR gate 111c that is connected with the AND gate 110e and the AND gate 110f, and an OR gate 111d that is connected with the AND gate 110g and the AND gate 110h.

The twelve flip-flops 102a to 102l are synchronized with clocks oscillated by the clock oscillator 101.

The output voltage that is input from the comparator 12a to the representing-value decision logic circuit 100a is input, via the flip-flop 102a and the flip-flop 102b, to the AND gate 104a and the inverter 103a. The inverter 103a inverts the output voltage that has been input and inputs the output voltage to the AND gate 105a.

The output voltage that is input from the comparator 12b to the representing-value decision logic circuit 100a is input, via the flip-flop 102c and the flip-flop 102d, to the AND gate 104a and the inverter 103b. The inverter 103b inverts the output voltage that has been input and inputs the output voltage to the AND gate 106a.

The output voltage that is input from the comparator 12c to the representing-value decision logic circuit 100a is input, via the flip-flop 102e and the flip-flop 102f, to the AND gate 105a and the inverter 103c. The inverter 103c inverts the output voltage that has been input and inputs the output voltage to the AND gate 107a.

The output voltage that is input from the comparator 12d to the representing-value decision logic circuit 100a is input, via the flip-flop 102g and the flip-flop 102h, to the AND gate 105a and the inverter 103d. The inverter 103d inverts the output voltage that has been input and inputs the output voltage to the AND gate 106a.

The output voltage that is input from the comparator 12e to the representing-value decision logic circuit 100a is input, via the flip-flop 102*i* and the flip-flop 102*j*, to the AND gate 105*a* and the inverter 103*e*. The inverter 103*e* inverts the output voltage that has been input and inputs the output voltage to the AND gate 107*a*.

The output voltage that is input from the comparator 12*f* to the representing-value decision logic circuit 100*a* is input, via the flip-flop 102*k* and the flip-flop 102*l*, to the AND gate 106*a* and the inverter 103*f*. The inverter 103*f* inverts the output voltage that has been input and inputs the output voltage to the AND gate 107*a*.

The AND gate 104*a* calculates the logical product of the output voltages that have been input and outputs the lowest output voltage of the regulator A 11*a*. The lowest output voltage of the regulator A 11*a* is input to the AND gate 108*a*.

Further, the AND gate 105*a* calculates the logical product of the output voltages that have been input and outputs the lowest output voltage of the regulator B 11*b*. The lowest voltage of the regulator B 11*b* is input to the AND gate 108*b* and invertedly input to the AND gate 108*a*.

Further, the AND gate 106*a* calculates the logical product of the output voltages that have been input and outputs the lowest output voltage of the regulator C 11*c*. The lowest output voltage of the regulator C 11*c* is input to the AND gate 108*c* and invertedly input to the AND gate 108*a*.

Further, the AND gate 107*a* calculates the logical product of the output voltages that have been input and outputs the lowest output voltage of the regulator D 11*d*. The lowest output voltage of the regulator D 11*d* is invertedly input to the AND gate 108*a* and is input to the AND gate 110*g*.

The AND gate 108*a* calculates the logical product of the output voltages that have been input and inputs the output voltage based on the logical product to the AND gate 110*a*. Further, the AND gate 108*b* calculates the logical product of the output voltages that have been input and inputs the output voltage based on the logical product to the AND gate 110*c*. The AND gate 108*c* calculates the logical product of the output voltages that have been input and inputs the output voltage based on the logical product to the AND gate 110*e*.

The setting values of a one-bit register 0 and register 2 are input from the general-purpose input/output interface 16 to the decoder 109 of the representing-value decision logic circuit 100*a*. The decoder 109 inputs results of decoding of the setting values to the AND gate 110*b*, the AND gate 110*d*, the AND gate 110*f*, and the AND gate 110*h*. Further, an enabling input values that have been input from the general-purpose input/output interface 16 are invertedly input to the AND gate 110*a*, the AND gate 110*c*, the AND gate 110*e*, and the AND gate 110*g*, respectively.

The AND gate 110*a* and the AND gate 110*b* calculate the logical products of inputs thereof and input the logical products to the OR gate 111*a*. The OR gate 111*a* calculates the logical sum of inputs from the AND gate 110*a* and the AND gate 110*b* and outputs the logical sum to the selector 13.

Further, the AND gate 110*c* and the AND gate 110*d* calculate the logical products of inputs thereof and input the logical products to the OR gate 111*b*. The OR gate 111*b* calculates the logical sum of inputs from the AND gate 110*c* and the AND gate 110*d* and then outputs the logical sum to the selector 13.

Further, the AND gate 110*e* and the AND gate 110*f* calculate the logical products of inputs thereof and input the logical products to the OR gate 111*c*. The OR gate 111*c* calculates the logical sum of inputs from the AND gate 110*e* and the AND gate 110*f* and outputs the logical sum to the selector 13.

Further, the AND gate 110*g* and the AND gate 110*h* calculate the logical products of inputs thereof and input the logical products to the OR gate 111*d*. The OR gate 111*d* calculates the logical sum of the AND gate 110*g* and the AND gate 110*h* and then outputs the logical sum to the selector 13.

With the configuration described above, the representing-value decision logic circuit 100*a* may select and output only the lowest output voltage of all four output voltages that have been input, whereby only the output voltage of the regulator that outputs the selected output voltage may be monitored.

Figure 5:
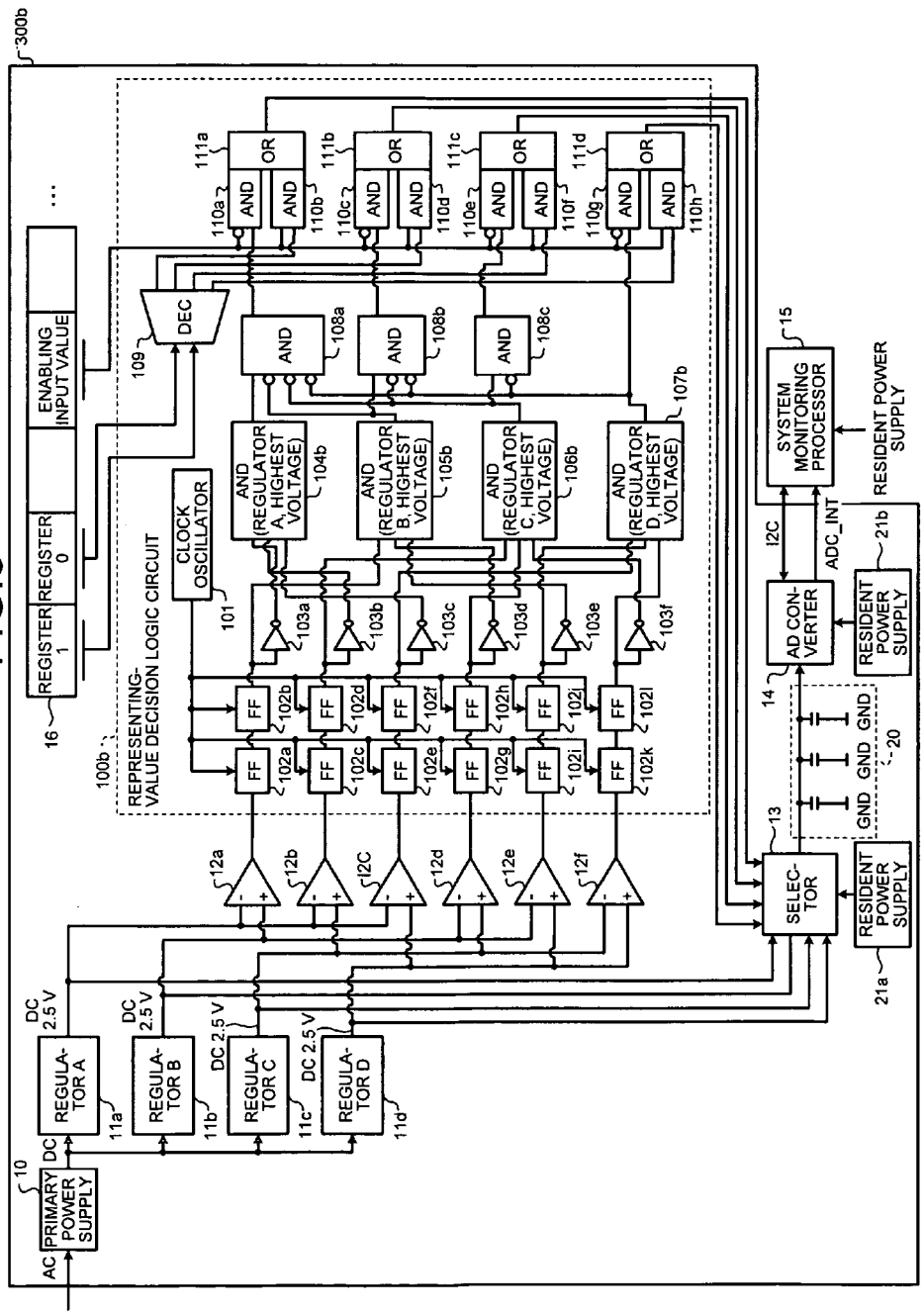
FIG. 5 is a block diagram illustrating a detailed configuration of a power supply apparatus and a voltage monitoring circuit in accordance with an example of a second embodiment where a secondary power supply is replaced by a plurality of regulators.

The following describes detailed configurations of a power supply apparatus and a voltage monitoring circuit in accordance with an example of a second embodiment where a secondary power supply is replaced by a plurality of regulators. FIG. 5 is a block diagram illustrating detailed configurations of a power supply apparatus and a voltage monitoring circuit in accordance with an example of a second embodiment where a secondary power supply is replaced by a plurality of regulators. Although FIG. 5 illustrates a case where four regulators are connected, where the number of regulators is not limited to four. Further, illustrations of load devices, each connected to regulators, are omitted.

An outline of a second embodiment is described below. In the power supply apparatus, a secondary power supply, which is a 2.5 V power supply, includes four regulators, and the four regulators output a 2.5 V voltage on the basis of an input voltage and a power-supply activation instruction signal (not illustrated). The values of voltages output from the four regulators are compared by a comparator circuit. Based on a comparison result, the representing-value decision logic circuit selects a regulator that outputs the highest voltage value.

A representing-value decision logic circuit 100*b* of a power supply apparatus 300*b* in accordance with an example of a second embodiment includes an AND gate 104*b*, an AND gate 105*b*, an AND gate 106*b*, and an AND gate 107*b*, instead of the AND gate 104*a*, the AND gate 105*a*, the AND gate 106*a*, and the AND gate 107*a*. Other than those components, the representing-value decision logic circuit 100*b* has the same configuration as the representing-value decision logic circuit 100*a* of the power supply apparatus 300*a* in accordance with the first embodiment. Therefore, the power supply apparatus 300*b* has the same configuration as the power supply apparatus 300*a* except for the above-mentioned difference in the configuration of the representing-value decision logic circuit 100*b*.

The output voltage that is input from the comparator 12*a* to the representing-value decision logic circuit 100*b* is input, via the flip-flop 102*a* and the flip-flop 102*b*, to the AND gate 105*b* and the inverter 103*a*. The inverter 103*a* inverts the output voltage that has been input and inputs the output voltage to the AND gate 104*b*.

The output voltage that is input from the comparator 12*b* to the representing-value decision logic circuit 100*b* is input, via the flip-flop 102*c* and the flip-flop 102*d*, to the AND gate 106*b* and the inverter 103*b*. The inverter 103*b* inverts the output voltage that has been input and inputs the output voltage to the AND gate 104*b*.

The output voltage that is input from the comparator 12*c* to the representing-value decision logic circuit 100*b* is input, via the flip-flop 102*e* and the flip-flop 102*f*, to the AND gate 107*b* and the inverter 103*c*. The inverter 103*c* inverts the output voltage that has been input and inputs the output voltage to the AND gate 104*b*.

The output voltage that is input from the comparator 12*d* to the representing-value decision logic circuit 100*b* is input, via the flip-flop 102*g* and the flip-flop 102*h*, to the AND gate 106*b* and the inverter 103*d*. The inverter 103*d* inverts the output voltage that has been input and inputs the output voltage to the AND gate 105*b*.

The output voltage that is input from the comparator 12e to the representing-value decision logic circuit 100b is input, via the flip-flop 102i and the flip-flop 102j, to the AND gate 107b and the inverter 103e. The inverter 103e inverts the output voltage that has been input and inputs the output voltage to the AND gate 105b.

The output voltage that is input from the comparator 12f to the representing-value decision logic circuit 100b is input, via the flip-flop 102k and the flip-flop 102l, to the AND gate 107b and the inverter 103f. The inverter 103f inverts the output voltage that has been input and inputs the output voltage to the AND gate 106b.

The AND gate 104b calculates the logical product of output voltages that have been input and outputs the highest output voltage of the regulator A 11a. The highest output voltage of the regulator A 11a is input to the AND gate 108a.

Further, the AND gate 105b calculates the logical product of output voltages that have been input and outputs the highest output voltage of the regulator B 11b. The highest output voltage of the regulator B 11b is input to the AND gate 108b and invertedly input to the AND gate 108a.

Further, the AND gate 106b calculates the logical product of the output voltages that have been input and outputs the highest voltage of the regulator C 11c. The highest output voltage of the regulator C 11c is input to the AND gate 108c and invertedly input to the AND gate 108a.

Further, the AND gate 107b calculates the logical product of the output voltages that have been input and outputs the highest voltage of the regulator D 11d. The highest output voltage of the regulator D 11d is invertedly input to the AND gate 108a and the AND gate 108c and is input to the AND gate 110g.

The selector 13 selects the regulator that outputs the lowest or highest output voltage of all inputs from the representing-value decision logic circuit 100b and thus selects only the output voltage that is output from the regulator and sends the output voltage to the smoothing circuit 20. The selector 13 is an analogue multiplexer or an analogue switch.

With the configuration described above, the representing-value decision logic circuit 100b may select and output only the highest output voltage of all four output voltages that have been input, whereby only the output voltage of the regulator that outputs the selected output voltage may be monitored.

Figure 6:
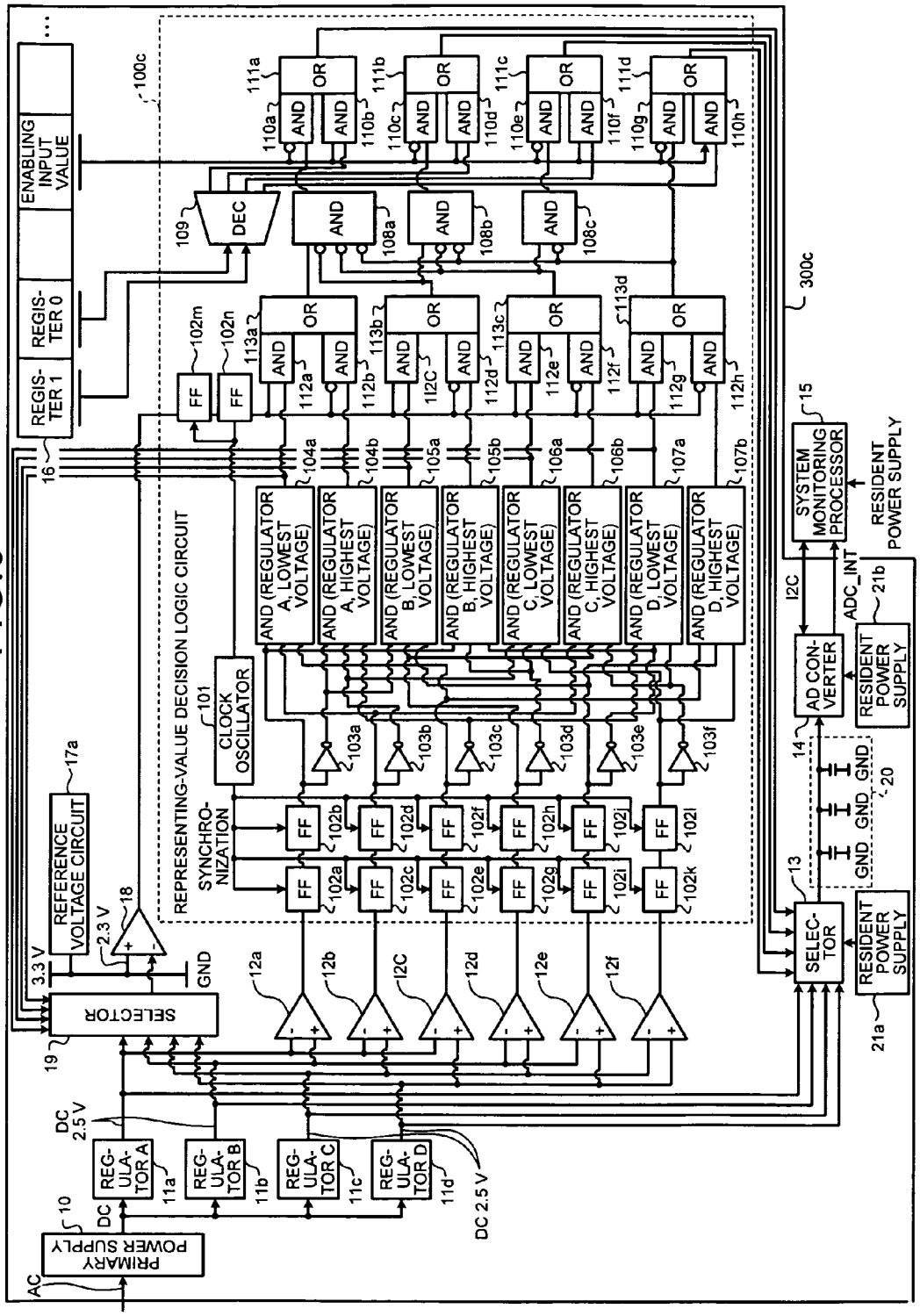
FIG. 6 is a block diagram illustrating a detailed configuration of a power supply apparatus and a voltage monitoring circuit in accordance with an example of a third embodiment where a secondary power supply is replaced by a plurality of regulators.

The following describes detailed configurations of a power supply apparatus and a voltage monitoring circuit in accordance with an example of a third embodiment where a secondary power supply is replaced by a plurality of regulators. FIG. 6 is a block diagram illustrating detailed configurations of a power supply apparatus and a voltage monitoring circuit in accordance with an example of a third embodiment where a secondary power supply is replaced by a plurality of regulators. Although FIG. 6 illustrates a case where four regulators are connected, where the number of regulators is not limited to four. In FIG. 6, illustrations of load devices, each connected to regulators, are omitted.

An outline of an example of a third embodiment is described below. In the power supply apparatus, a secondary power supply, which is a 2.5 V power supply, includes four regulators, and the four regulators output a 2.5 V voltage on the basis of an input voltage and a power-supply activation instruction signal (not illustrated). The values of voltages output from the four regulators are compared by a comparator circuit. Based on a comparison result, the representing-value decision logic circuit selects the highest voltage value or a regulator that outputs the highest voltage value.

Further, for example, when whether the lowest voltage value is lower than the determined minimum threshold value (e.g., 2.3 V) or not is determined and the lowest voltage value turns out to be lower than the predetermined threshold value, a regulator that outputs the lowest voltage value is selected. When the lowest voltage value is equal to or higher than the predetermined threshold value, a regulator that indicates the highest value is selected without any further consideration. Thus, the regulator with the lowest voltage is preferentially selected. When the voltage is within the range of the predetermined voltage, the regulator with the highest voltage is selected. The power supply for operating each device other than the regulators is a resident power supply, which is different from the 2.5 V power supply.

The following describes only differences between a configuration of a power supply apparatus 300c in accordance with an example of the third embodiment and a configuration of the power supply apparatus 300a in accordance with an example of the first embodiment. Compared with the power supply apparatus 300a, the power supply apparatus 300c further includes a reference voltage circuit 17a, a comparator 18, and a representing-value decision logic circuit 100c. The representing-value decision logic circuit 100c constitutes a configuration which is different from the representing-value decision logic circuits 100a and 100b.

The regulator A 11a, the regulator B 11b, the regulator C 11c, and the regulator D 11d convert the voltages of the DC currents supplied from the primary power supply 10 into 2.5 V. The DC current, which has been converted into the 2.5 V, is referred to as "output voltage".

The output voltage of the regulator A 11a is input to the inverting input terminals of the comparators 12a to 12c and to a selector 19. The output voltage of the regulator B 11b is input to the non-inverting terminal of the comparator 12a, the inverting terminal of the comparator 12d, the inverting terminal of the comparator 12e, and the selector 19.

The output voltage of the regulator C 11c is input to the non-inverting terminal of the comparator 12b, the non-inverting terminal of the comparator 12d, the inverting terminal of the comparator 12f, and the selector 19. The output voltage of the regulator D 11d is input to the non-inverting terminal of the comparator 12c, the non-inverting terminal of the comparator 12e, and the non-inverting terminal of the comparator 12f, and the selector 19. The selector 19 is an analogue multiplexer or an analogue switch.

Further, the regulator A 11a, the regulator B 11b, the regulator C 11c, and the regulator D 11d supply output voltages to the comparators 12a to 12f and the selector 13.

The comparators 12a to 12f select the output voltage higher than the output voltages that have been input thereto and input the higher output voltage to the representing-value decision logic circuit 100c.

The representing-value decision logic circuit 100c includes, for example, a clock oscillator 101 that oscillates 100 kHz clocks, a flip-flop 102a and a flip-flop 102b, a flip-flop 102c and a flip-flop 102d, a flip-flop 102e and a flip-flop 102f, a flip-flop 102g and a flip-flop 102h, a flip-flop 102i and a flip-flop 102j, a flip-flop 102k and a flip-flop 102l, a flip-flop 102m and a flip-flop 102n, six inverters 103a to 103f, an AND gate 104a and an AND gate 104b, an AND gate 105a and an AND gate 105b, an AND gate 106a and an AND gate 106b, and an AND gate 107a and an AND gate 107b.

The representing-value decision logic circuit 100c includes an AND gate 108a, an AND gate 108b, an AND gate 108c, an AND gate 112a and an AND gate 112b, an AND gate 112c and an AND gate 112d, an AND gate 112e and an AND gate 112f, an AND gate 112g and an AND gate 112h, an OR gate 113a that is connected with the AND gate 112a and the AND gate 112b, an OR gate 113b that is connected with the AND gate 112c and the AND gate 112d, an OR gate 113c that is connected with the AND gate 112e and the AND gate 112f, and an OR gate 113d that is connected with the AND gate 112g and the AND gate 112h.

Further, the representing-value decision logic circuit 100c includes a decoder 109, an AND gate 110a and an AND gate 110b, an AND gate 110c and an AND gate 110d, an AND gate 110e and an AND gate 110f, an AND gate 110g and an AND gate 110h, an OR gate 111a that is connected with the AND gate 110a and the AND gate 110b, an OR gate 111b that is connected with the AND gate 110c and the AND gate 110d, an OR gate 111c that is connected with the AND gate 110e and the AND gate 110f, and an OR gate 111d that is connected with the AND gate 110g and the AND gate 110h.

Fourteen flip-flops 102a to 102n are synchronized by clocks oscillated from the clock oscillator 101.

The output voltage that is input from the comparator 12a to the representing-value decision logic circuit 100c is input, via the flip-flop 102a and the flip-flop 102b, to the AND gate 104a, the AND gate 105b, and the inverter 103a. The inverter 103a inverts the output voltage that has been input and inputs the output voltage to the AND gate 104b, and also inverts the output voltage and inputs the output voltage to the AND gate 105a.

The output voltage that is input from the comparator 12b to the representing-value decision logic circuit 100c is input, via the flip-flop 102c and the flip-flop 102d, to the AND gate 104a, the AND gate 106b, and the inverter 103b. The inverter 103b inverts the output voltage that has been input and inputs the output voltage to the AND gate 104b and the AND gate 106a.

The output voltage that is input from the comparator 12c to the representing-value decision logic circuit 100c is input, via the flip-flop 102e and the flip-flop 102f, to the AND gate 104a, the AND gate 107b, and the inverter 103c. The inverter 103c inverts the output voltage that has been input and inputs the output voltage to the AND gate 104b and the AND gate 107a.

The output voltage that is input from the comparator 12d to the representing-value decision logic circuit 100c is input, via the flip-flop 102g and the flip-flop 102h, to the AND gate 105a, the AND gate 106b, and the inverter 103d. The inverter 103d inputs the output voltage that has been input and inputs the output voltage to the AND gate 105b and the AND gate 106a.

The output voltage that is input from the comparator 12e to the representing-value decision logic circuit 100c is input, via the flip-flop 102i and the flip-flop 102j, to the AND gate 105a, the AND gate 107b, and the inverter 103e. The inverter 103e inverts the output voltage that has been input and inputs the output voltage to the AND gate 105b and the AND gate 107a.

The output voltage that is input from the comparator 12f to the representing-value decision logic circuit 100c is input, via the flip-flop 102k and the flip-flop 102l, to the AND gate 106a, the AND gate 107b, and the inverter 103f. The inverter 103f inverts the output voltage that has been input and inputs the output voltage to the AND gate 106b and the AND gate 107a.

The AND gate 104a calculates the logical product of the output voltages that have been input and outputs the lowest output voltage of the regulator A 11a. The lowest output voltage of the regulator A 11a is input to the AND gate 112a and the selector 19.

The AND gate 104b calculates the logical product of the output voltages that have been input and outputs the highest output voltage of the regulator A 11a. The highest output voltage of the regulator A 11a is input to the AND gate 112b.

Further, the AND gate 105a calculates the logical product of the output voltages that have been input and outputs the lowest output voltage of the regulator B 11b. The lowest output voltage of the regulator B 11b is input to the AND gate 112c and the selector 19.

Further, the AND gate 105b calculates the logical product of the output voltages that have been input and outputs the highest output voltage of the regulator B 11b. The highest output voltage of the regulator B 11b is input to the AND gate 112d.

Further, the AND gate 106a calculates the logical product of the output voltages that have been input and outputs the lowest output voltage of the regulator C 11c. The lowest output voltage of the regulator C 11c is input to the AND gate 112e and the selector 19.

Further, the AND gate 106b calculates the logical product of the output voltages that have been input and outputs the highest output voltage of the regulator C 11c. The highest output voltage of the regulator C 11c is input to the AND gate 112f.

Further, the AND gate 107a calculates the logical product of the output voltages that have been input and outputs the lowest output voltage of the regulator D 11d. The lowest output voltage of the regulator D 11d is input to the AND gate 112g and the selector 19.

Further, the AND gate 107b calculates the logical product of the output voltages that have been input and outputs the highest output voltage of the regulator D 11d. The highest output voltage of the regulator D 11d is input to the AND gate 112h.

The selector 19 selects one of the output voltages on the basis of all inputs from the regulator A 11a, the regulator B 11b, the regulator C 11c, and the regulator D 11d and from the AND gate 104a, the AND gate 105a, the AND gate 106a, and the AND gate 107a, and then inputs the selected output voltage to the inverting terminal of the comparator 18. Further, the 2.3 V output voltage from the reference voltage circuit 17a is input to the non-inverting terminal of the comparator 18. The comparator 18 compares one of the single output voltage with the 2.3 V output voltage and then outputs the higher output voltage, which is input to the flip-flop 102m. The output voltage that has been output from the comparator 18 is input, via the flip-flop 102m to the flip-flop 102n, to the AND gate 112a, the AND gate 112c, the AND gate 112e, and the AND gate 112g, and invertedly input to the AND gate 112b, the AND gate 112d, the AND gate 112f, and the AND gate 112h.

The AND gate 112a and the AND gate 112b calculate the logical products of inputs thereof and input the logical products to the OR gate 113a. The OR gate 113a calculates the logical sum of inputs from the AND gate 112a and the AND gate 112b and inputs the logical sum to the AND gate 108a.

Further, the AND gate 112c and the AND gate 112d calculate the logical products of inputs thereof and inputs the logical products to the OR gate 113b. The OR gate 113b calculates the logical sum of inputs from the AND gate 112c and the AND gate 112d. Then, the OR gate 113b inputs the logical sum invertedly to the AND gate 108a and inputs the logical sum to the AND gate 108b.

Further, the AND gate 112e and the AND gate 112f calculate the logical products of inputs thereof and input the logical products to the OR gate 113c. The OR gate 113c calculates the logical sum of the AND gate 112e and the AND gate 112f. Then, the OR gate 113c inputs the logical sum invertedly to the AND gate 108a and the AND gate 108b and inputs the logical sum to the AND gate 108c.

Further, the AND gate 112g and the AND gate 112h calculate the logical products of inputs thereof and input the logical products to the OR gate 113d. The OR gate 113d calculates the logical cum of the AND gate 112g and the AND gate 112h. Then, the OR gate 113d inputs the logical sum invertedly to the AND gate 108a, the AND gate 108b, and the AND gate 108c and inputs the logical sum to the AND gate 110g.

The AND gate 108a calculates the logical product of output voltages that have been input and inputs the output voltage based on the logical product to the AND gate 110a. Further, the AND gate 108b calculates the logical product of output voltages that have been input and inputs the output voltage based on the logical product to the AND gate 110c. Further, the AND gate 108c calculates the logical product of output voltages that have been input and inputs the output voltage based on the logical product to the AND gate 110e.

The setting values of the one-bit register 0 and register 2 are input from the general-purpose input/output interface 16 to the decoder 109 of the representing-value decision logic circuit 100c. The decoder 109 inputs results of decoding of the setting values to the AND gate 110b, the AND gate 110d, the AND gate 110f, and the AND gate 110h. Further, the enabling input value that is input from the general-purpose input/output (GPIO) interface 16 is invertedly input to the AND gate 110a, the AND gate 110c, the AND gate 110e, and the AND gate 110g.

The AND gate 110a and the AND gate 110b calculate the logical products of inputs thereof and input the logical products to the OR gate 111a. The OR gate 111a calculates the logical sum of inputs from the AND gate 110a and the AND gate 110b and then outputs the logical sum to the selector 13.

Further, the AND gate 110c and the AND gate 110d calculate the logical products of inputs thereof and input the logical products to the OR gate 111b. The OR gate 111b calculates the logical sum of inputs from the AND gate 110c and the AND gate 110d and then outputs the logical sum to the selector 13.

Further, the AND gate 110e and the AND gate 110f calculate the logical products of inputs thereof and input the logical products to the OR gate 111c. The OR gate 111c calculates the logical sum of inputs from the AND gate 110e and the AND gate 110f and then outputs the logical sum to the selector 13.

Further, the AND gate 110g and the AND gate 110h calculate the logical products of inputs thereof and input the logical products to the OR gate 111d. The OR gate 111d calculates the logical sum of inputs from the AND gate 110g and the AND gate 110h and then outputs the logical sum to the selector 13.

With the configuration above, the representing-value decision logic circuit 100c may select and output only the lowest or highest voltage of four output voltages that have been input. When it is determined whether the lowest output voltage is lower than the predetermined lowest threshold value (e.g., 2.3 V) or not and the lowest output voltage turns out to be equal to or higher than the lowest threshold value, the highest output voltage may be selected and output. When the lowest output voltage is lower than the lowest threshold value, the lowest output voltage may be selected and output. Thus, only the output voltage of a regulator that output the selected output voltage may be monitored.

Figure 7:
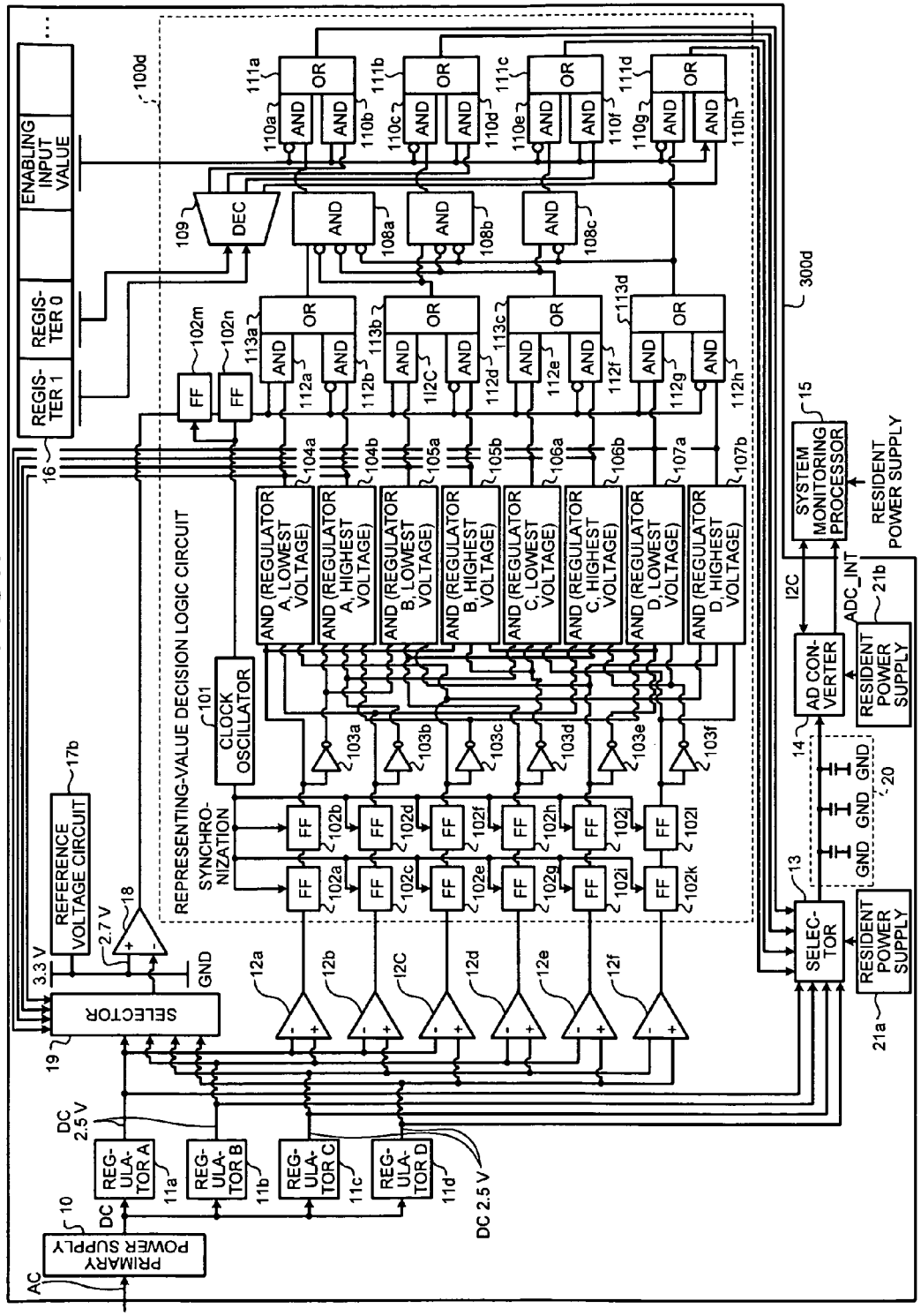
FIG. 7 is a block diagram illustrating a detailed configuration of a power supply apparatus and a voltage monitoring circuit in accordance with an example of a fourth embodiment where a secondary power supply is replaced by a plurality of regulators.

Detailed configurations of a power supply apparatus and a voltage monitoring circuit in accordance with an example of a fourth embodiment where a secondary power supply is replaced by a plurality of regulators are described below. FIG. 7 illustrates a block diagram of detailed configurations of the power supply apparatus and the voltage monitoring circuit in accordance with an example of the fourth embodiment where the secondary power supply is replaced by a plurality of regulators. Although FIG. 7 illustrates a case where four regulators are connected, where the number of regulators is not limited to four. Further, in FIG. 7, illustrations of load devices, each connected with regulators, are omitted.

An outline of an example of the fourth embodiment is described below. In the power supply apparatus, a secondary power supply, which is a 2.5 V power supply, includes four regulators, and the four regulators output a 2.5 V voltage on the basis of an input voltage and a power-supply activation instruction signal (not illustrated). The values of voltages output from the four regulators are compared by a comparator circuit. Based on a comparison result, a representing-value decision logic circuit selects the regulator that outputs the highest voltage value.

When it is determined that the highest voltage is higher than the highest threshold value (e.g., 2.7 V) and the highest voltage turns out to be equal to or lower than the predetermined highest threshold value, the regulator that outputs the lowest voltage value is selected. When the highest voltage value is higher than the predetermined threshold value, the regulator that outputs the highest voltage value is selected without any further consideration. Thus, the regulator with the highest voltage value is preferentially selected. When the voltage is within the range of the predetermined voltage, the regulator with the lowest voltage value is selected. The power supply for operating each device other than the regulators is a resident power supply, which is different from the 2.5 V power supply.

The configuration of a power supply apparatus 300d in accordance with an example of a fourth embodiment is like as a configuration of the power supply apparatus 300a in accordance with an example of the first embodiment; and therefore, the following describes only differences between these configurations. The power supply apparatus 300d is different from the power supply apparatus 300c because, in the power supply apparatus 300d, a signal indicating the regulator that outputs the highest voltage is input to the selector 19, and the voltage input to the non-inverting terminal of the comparator 18 is 2.7 V due to a reference voltage circuit 17b.

With the configuration above, a representing-value decision logic circuit 100d may select and output only the lowest or highest output voltage of four output voltages that have been input. When it is determined whether the highest output voltage is higher than the predetermined lowest threshold value (e.g., 2.7 V) or not and the highest output voltage turns out to be equal to or lower than the highest threshold value, the lowest output voltage may be selected and output. When the highest output voltage is higher than the highest threshold value, the highest output voltage may be selected and output. Thus, only the output voltage of a regulator that outputs the selected output voltage may be monitored.

Figure 8:
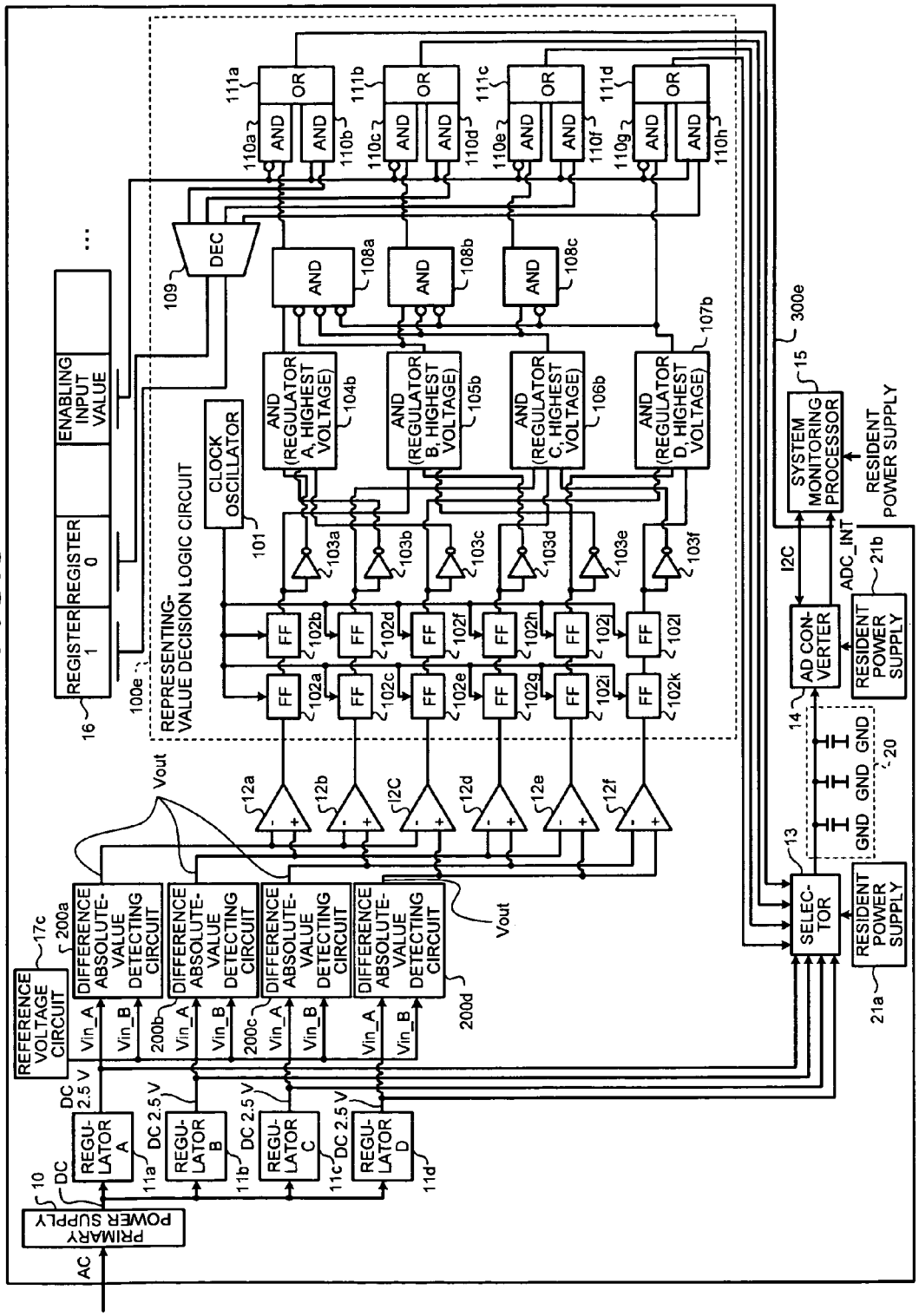
FIG. 8 is a block diagram illustrating a detailed configuration of a power supply apparatus and a voltage monitoring circuit in accordance with an example of a fifth embodiment where a secondary power supply is replaced by a plurality of regulators.

Detailed configurations of a power supply apparatus and a voltage monitoring circuit in accordance with an example of a fifth embodiment where a secondary power supply is replaced by a plurality of regulators are described below. FIG. 8 illustrates a block diagram of detailed configurations of the power supply apparatus and the voltage monitoring apparatus in accordance with an example of the fifth embodiment where a secondary power supply is replaced by a plurality of regulators. Although FIG. 8 illustrates a case where four regulators are connected, where the number of regulators is not limited to four. In FIG. 8, illustrations of load devices, each connected with regulators, are omitted.

An outline of an example of the fifth embodiment is described below. In the power supply apparatus, a secondary power supply, which is a 2.5 V power supply, includes four regulators, and the four regulators output a 2.5 V voltage on the basis of an input voltage and a power-supply activation instruction signal (not illustrated). The values of voltages output from the four regulators are compared by a comparator circuit. Based on a comparison result, the lowest voltage value of a difference between the output voltage and the predetermined reference voltage or a regulator that outputs the lowest voltage value is selected. Based on a comparison result, the representing-value decision logic circuit selects the highest voltage value of a difference between the output voltage and the predetermined reference voltage or a regulator that outputs the lowest voltage value.

In this embodiment, differences, i.e., absolute values, between the output voltages of the regulators and the predetermined reference voltage are calculated, and the regulator that produces the highest absolute value is selected.

A power supply apparatus 300e in accordance with an example of the fifth embodiment is different from the power supply apparatus 300b in accordance with an example of the second embodiment because the power supply apparatus 300e further includes a reference voltage circuit 17c and difference absolute-value detecting circuits 200a, 200b, 200c, and 200d. Further, a representing-value decision logic circuit 100e of the power supply apparatus 300e has the same configuration as the representing-value decision logic circuit 100b of the power supply apparatus 300b in accordance with the second embodiment. The difference absolute-value detecting circuits 200a, 200b, 200c, and 200d are referred to collectively as "difference absolute-value detecting circuit 200".

The regulator A 11a inputs direct current, which has been converted into 2.5 V, into the difference absolute-value detecting circuit 200a and the selector 13 as Vin_A. The regulator B 11b inputs direct current, which has been converted into 2.5 V, into the difference absolute-value detecting circuit 200b and the selector 13 as Vin_A. The regulator C 11c inputs direct current, which has been converted into 2.5 V, into the difference absolute-value detecting circuit 200c and the selector 13 as Vin_A. The regulator D 11d inputs direct current, which has been converted into 2.5 V, into the difference absolute-value detecting circuit 200d and the selector 13 as Vin_A. The reference voltage circuit 17c, which provides 2.5 V, inputs the reference voltage into the difference absolute-value detecting circuits 200a, 200b, 200c, and 200d as Vin_B.

The difference absolute-value detecting circuit 200a calculates the absolute value (Vout) of the difference between the output voltage of the regulator A 11a and the 2.5 V reference voltage. Then, the difference absolute-value detecting circuit 200a inputs the absolute value of the difference into the inverting terminals of the comparator 12a, the comparator 12b, and the comparator 12c.

The difference absolute-value detecting circuit 200b calculates the absolute value (Vout) of the difference between the output voltage of the regulator B 11b and the 2.5 V reference voltage. Then, the difference absolute-value detecting circuit 200b inputs the absolute value of the difference into the non-inverting terminal of the comparator 12a and into the inverting terminals of the comparator 12d and the comparator 12e.

The difference absolute-value detecting circuit 200c calculates the absolute value (Vout) of the difference between the output voltage of the regulator C 11c and the 2.5 V reference voltage. Then, the difference absolute-value detecting circuit 200c inputs the absolute value of the difference into the non-inverting terminals of the comparator 12b and the comparator 12d and the inverting terminal of the comparator 12f.

The difference absolute-value detecting circuit 200d calculates the absolute value (Vout) of the difference between the output voltage of the regulator D 11d and the 2.5 V reference voltage. Then, the difference absolute-value detecting circuit 200d inputs the absolute value of the difference into the non-inverting terminals of the comparator 12c and the comparator 12e and the inverting terminal of the comparator 12f.

The absolute values of differences that have been input to the comparators 12a to 12f as described above are input to the representing-value decision logic circuit 100e as an output voltage having a higher voltage value. The subsequent processes are performed in the same way as the representing-value decision logic circuit 100b in accordance with an example of the second embodiment.

With the configuration above, the representing-value decision logic circuit 100e may select and output only the highest absolute value of the difference of all between the four output voltages that have been input and 2.5 V. Thus, only the output voltage of the regulator that outputs the absolute value of the selected difference may be monitored.

Figure 9:
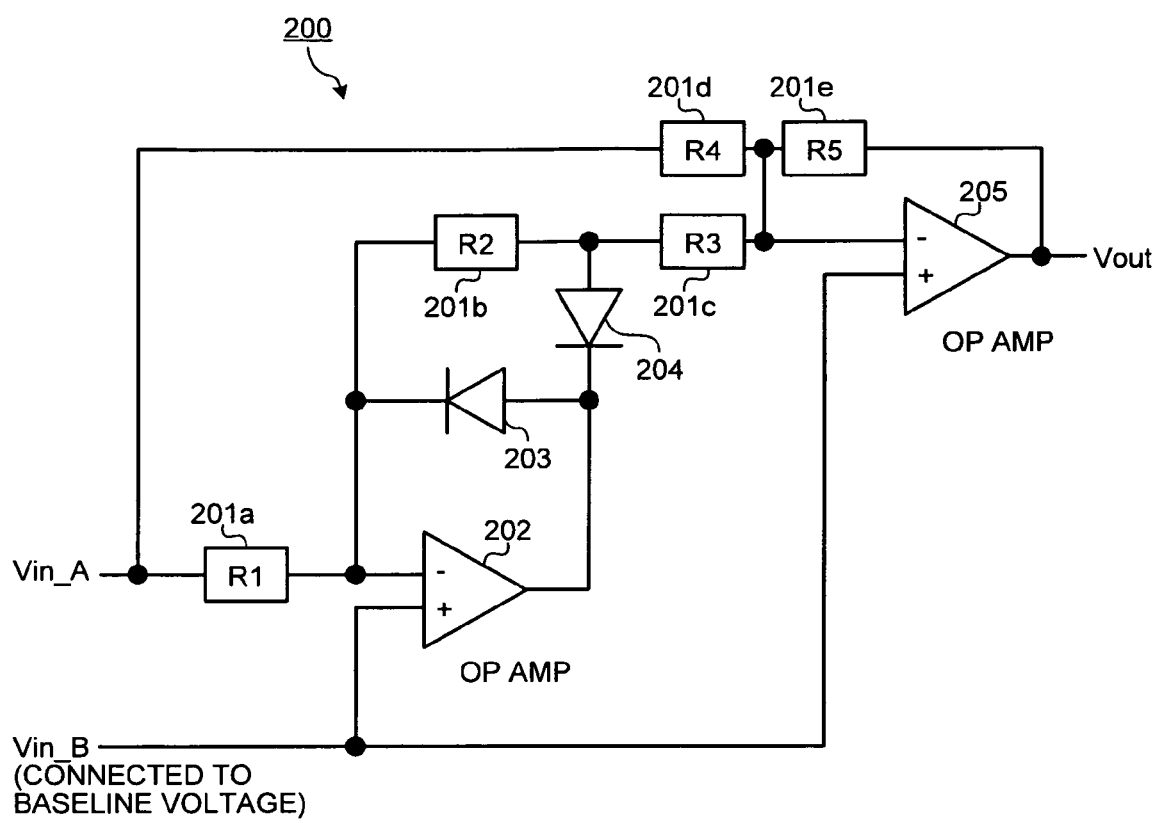
FIG. 9 is a block diagram illustrating a detailed configuration of a difference absolute value detecting circuit that is included in a power supply apparatus in accordance with an example of a fifth embodiment where a secondary power supply is replaced by a plurality of regulators.

Detailed configurations of the difference absolute-value detecting circuit included in the power supply apparatus in accordance with an example of the fifth embodiment where a secondary power supply is replaced by a plurality of regulators are described below. FIG. 9 is a block diagram illustrating detailed configurations of the difference absolute-value detecting circuit included in the power supply apparatus in accordance with an example of the fifth embodiment where a secondary power supply is replaced by a plurality of regulators.

The difference absolute-value detecting circuit 200 is a circuit that receives Vin_A, which is DC current of the predetermined output voltage, and Vin_B, which is DC current of the reference voltage, as input and outputs Vout, which is direct current. The difference absolute-value detecting circuit 200 is thus a circuit that calculates and outputs an absolute value of a difference between the output voltage of a regulator and the predetermined reference voltage.

The difference absolute-value detecting circuit 200 includes an R1 resistor 201a, an R2 resistor 201b, an R3 resistor 201c, an R4 resistor 201d, an R5 resistor 201e, an OP amp (Operational Amplifier) 202, a diode 203, a diode 204, and an OP amp 205. When the resistance value of the R1 resistor 201a, the R2 resistor 201b, and the R3 resistor 201c is a predetermined resistance value R [Ω], the resistance value of the R4 resistor 201d and the R5 resistor 201e is 2 R [Ω]. The OR amp is an amplifier of DC current of an analogue signal.

Vin_A that has been input to the difference absolute-value detecting circuit 200 is input to the R1 resistor 201a and the R4 resistor 201d. Vin_A that has passed through the R1 resistor 201a is input to the inverting terminal of the OP amp 202 and the R2 resistor 201b. Vin_B is input to the non-inverting terminal of the OP amp 202.

The OP amp 202 amplifies the input DC current by the predetermined amount and inputs the amplified signal to the diode 203. The diode 203 compares the input DC current with the DC current that is output from the R1 resistor 201a. The compared DC current is input to the R2 resistor 201b.

The DC current from the R2 resistor 201b is input to the R3 resistor 201c and the diode 204. The diode 204 compares the input DC current with the DC current from the OP amp 202 and inputs the input DC current to the diode 203.

The R2 resistor 201b inputs the input DC current to the inverting terminal of the OP amp 205. Further, Vin_B is input to the non-inverting terminal of the OP amp 205. The OP amp 205 amplifies the input DC current by the predetermined amount and outputs the same.

The DC current that has passed through the R4 resistor 201d and the R5 resistor 201e is compared with the output of the OP amp 205. The compared output is Vout, which is direct current. The circuit wire between the R4 resistor 201d and the R5 resistor 201e is connected, using the predetermined circuit wire, with the circuit wire between the R3 resistor 201c and the OP amp 205.

According to examples of the first to fifth embodiments, only the output voltage of the regulator that outputs the lowest or highest output voltage is monitored, which still results in the same effect of voltage monitoring of the secondary power supply as the effect by monitoring output voltages of all regulators.

Further, it is not necessary to prepare the AD converter for each regulator, the AD converter 14 and the system monitoring processor 15 may use conventional products, and it is not necessary to redesign the circuit for voltage monitoring. Therefore, it is not necessary to revise firmware of the system monitoring processor, whereby the circuit for voltage monitoring may maintain compatibility with the conventional configuration.

Although examples of embodiments are described above, where the present invention is not limited to these embodiments. The present invention may be applied in various embodiments that are different from those described above within the scope of the technical spirit in claims. Further, the effects described in the embodiments are not limited to those described.

Although the embodiments above illustrate a case where regulators are used as a secondary power supply, where the alternative of the regulator is not limited to this, and any convertible generic device may be used.

Further, all or some of the processes described in the embodiments above as being automatically performed may be performed manually, and all or some of the processes described as being manually performed may be performed automatically with a conventional method. Other than that, processes, control procedures, specific names, and information including various data and parameters, may be arbitrarily modified except as otherwise provided.

Further, the components of the apparatuses and devices illustrated are merely functional concepts, and the physical configurations of these components are not necessarily the same as those illustrated. Thus, specific embodiments of integration/disintegration of the apparatuses and devices are not limited to those illustrated. Depending on various kinds of load and operations statuses, all or some of the apparatuses and devices may be functionally or physically integrated/disintegrated into an arbitrary unit.

According to the embodiments described above, one of the output voltages of the secondary power supplies is selected, whereby only the selected output voltage of the secondary power supply may be converted into quantized voltage information.

According to the embodiments described above, the lowest output voltage of the secondary power supply of all output voltages of the secondary power supplies is selected, whereby only the selected output voltage of the secondary power supply may be converted into quantized voltage information.

According to the embodiments described above, the highest output voltage of the secondary power supply of all output voltages of the secondary power supplies is selected, whereby only the selected output voltage of the secondary power supply may be converted into quantized voltage information.

According to the embodiments described above, the lowest output voltage of the secondary power supply and the highest output voltage of the secondary power supply of all output voltages of the secondary power supplies are selected, the lowest output voltage of the secondary power supply is selected when the selected lowest output voltage of the secondary power supply is lower than a predetermined threshold voltage, and the highest output voltage of the secondary power supply is selected when the selected lowest output voltage of the secondary power supply is higher than the predetermined threshold voltage, thereby selecting either of the selected lowest or highest output voltage of the secondary power supply to convert the selected output voltage of the secondary power supply into quantized voltage information when the secondary power supply outputs a very low output voltage.

According to the embodiments described above, the lowest output voltage of the secondary power supply and the highest output voltage of the secondary power supply of all output voltages of the secondary power supplies are selected, the lowest output voltage of the secondary power supply is selected when the selected highest output voltage of the secondary power supply is lower than a predetermined threshold voltage, and the highest output voltage of the secondary power supply is selected when the selected highest output voltage of the secondary power supply is higher than the predetermined threshold voltage, thereby selecting either of the selected lowest or highest output voltage of the secondary power supply to convert the selected output voltage of the secondary power supply into quantized voltage information when the secondary power supply outputs a very high output voltage.

According to the embodiments described above, the absolute values of the difference voltages between the output voltages of the secondary power supplies and the reference voltages are output for each of the secondary power supplies, the absolute values of the difference voltages are compared by magnitude with each other, and the output voltage of the secondary power supply whose difference in the absolute value from the reference voltage is the highest is selected, thereby converting only the selected output voltage of the secondary power supply into quantized voltage information.

According to the embodiments described above, the power supply apparatus is connected with the monitoring control apparatus to which the quantized voltage information is input, thereby monitoring the quantized voltage information by the monitoring control apparatus.

According to the embodiments described above, the smoothed output voltage is converted into the quantized voltage information, thereby obtaining precisely quantized voltage information.

According to the embodiments described above, the secondary power supplies include stabilizing power supply circuits, whereby the secondary power supplies may be configured for a low-cost.

According to the embodiments described above, the selector and the converter are operated by the voltage supplied from the power supplies other than the secondary power supplies, whereby the selector and the converter may be stably operated.

According to the embodiments of the present invention, voltage monitoring of a secondary power supply may be made in order to maintain structural compatibility with a conventional power supply apparatus even when a secondary power supply is replaced by a plurality of regulators. Particularly, this allows a conventional configuration which includes a single AD converter and a single system monitoring processor that are needed to quantize and monitor output voltages of regulators, thereby reducing burden of redesigning a configuration related to power-supply monitoring of a power supply monitoring apparatus and the involved production cost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power supply apparatus, comprising:
   a primary power supply that outputs direct current;
   a plurality of secondary power supplies to each of which the direct current is inputted and a load device is connected, respectively;
   a selector to which output voltages outputted from the secondary power supplies are inputted and selects one of the output voltages; and
   a converter that converts the output voltage selected by the selector into quantized voltage information, wherein
   the selector selects the lowest output voltage and the highest output voltage of all output voltages outputted from the secondary power supplies;
   the selector outputs the selected lowest output voltage when the selected lowest output voltage is lower than a predetermined threshold voltage; and
   the selector outputs the selected highest output voltage when the selected lowest output voltage is higher than the predetermined threshold voltage.

2. The power supply apparatus according to claim 1, wherein
   the power supply apparatus is connected to a monitoring apparatus that monitors the quantized voltage information converted by the converter.

3. The power supply apparatus according to claim 1, further comprising a smoothing circuit that smoothes the output voltage selected by the selector and inputs the smoothed output voltage into the converter.

4. The power supply apparatus according to claim 1, wherein
   each of the secondary power supply comprises stabilizing power supply circuit that stabilizes the output voltage outputted from the secondary power supply.

5. The power supply apparatus according to claim 1, wherein
   the selector and the converter are operated by the voltage supplied from power supplies other than the secondary power supplies.

6. A power supply apparatus, comprising:
   a primary power supply that outputs direct current;
   a plurality of secondary power supplies to each of which the direct current is inputted and a load device is connected, respectively;
   a selector to which output voltages outputted from the secondary power supplies are inputted and selects one of the output voltages; and
   a converter that converts the output voltage selected by the selector into quantized voltage information, wherein
   the selector selects the lowest output voltage and the highest output voltage of all output voltages outputted from the secondary power supplies;
   the selector outputs the selected lowest output voltage when the selected highest output voltage is lower than a predetermined threshold voltage; and
   the selector selects the selected highest output voltage when the selected highest output voltage is higher than the predetermined threshold voltage.

7. A power supply apparatus, comprising:
   a primary power supply that outputs direct current;
   a plurality of secondary power supplies to each of which the direct current is inputted and a load device is connected, respectively;
   a plurality of difference voltage detectors to which output voltages outputted from the secondary power supplies and reference voltages are inputted and that outputs absolute values of difference voltages between the output voltages outputted from the secondary power supplies and the reference voltages for each of the secondary power supplies;
   a plurality of comparators that compare the absolute values of the difference voltages outputted from the difference voltage detectors with each other;
   a selector that selects the output voltage outputted from the secondary power supply whose difference in the absolute value from the reference voltage is the highest of all output voltages of the secondary power supplies based on comparison results of the comparators; and
   a converter that converts the output voltage selected by the selector into quantized voltage information.

8. A voltage monitoring method of a power supply apparatus, comprising:
   outputting direct current from a primary power supply;
   inputting the direct current into a plurality of secondary power supplies to each of which a load device is connected;
   receiving output voltages of the secondary power supplies as input and selecting one of the output voltages of the secondary power supplies by a selector; and
   converting the output voltage selected by the selector into quantized voltage information by a converter, wherein
   the selecting includes selecting the lowest output voltage and the highest output voltage of all output voltages outputted from the secondary power supplies, outputting the selected lowest output voltage when the selected lowest output voltage is lower than a predetermined threshold voltage, and outputting the selected highest output voltage when the selected lowest output voltage is higher than the predetermined threshold voltage.

9. The voltage monitoring method according to claim 8, wherein
   the power supply apparatus is connected to a monitoring apparatus that monitors the quantized voltage information converted by the converter.

10. The voltage monitoring method according to claim 8, wherein
    the power supply apparatus further comprises a smoothing circuit that smoothes the output voltage selected by the selector and inputs the smoothed output voltage into the converter.

11. The voltage monitoring method according to claim 8, wherein
    each of the secondary power supply comprises stabilizing power supply circuits that stabilizes the output voltage outputted from the secondary power supply.

12. The voltage monitoring method according to claim 8, wherein
the selector and the converter are operated by the voltage supplied from power supplies other than the secondary power supplies.

13. A voltage monitoring method of a power supply apparatus, comprising:
outputting direct current from a primary power supply;
inputting the direct current into a plurality of secondary power supplies to each of which a load device is connected;
receiving output voltages of the secondary power supplies as input and selecting one of the output voltages of the secondary power supplies by a selector; and
converting the output voltage selected by the selector into quantized voltage information by a converter, wherein
the selecting includes selecting the lowest output voltage and the highest output voltage of all output voltages outputted from the secondary power supplies, outputting the selected lowest output voltage when the selected highest output voltage is lower than a predetermined threshold voltage, and outputting the selected highest output voltage when the selected highest output voltage is higher than the predetermined threshold voltage.

14. A voltage monitoring method of a power supply apparatus, comprising:
outputting direct current from a primary power supply;
inputting the direct current into a plurality of secondary power supplies to each of which a load device is connected;
outputting absolute values of difference voltages between the output voltages outputted from the secondary power supplies and the reference voltages for each of the secondary power supplies by a plurality of difference voltage detectors to which the output voltages and reference voltages are inputted;
comparing the absolute values of the difference voltages outputted from the difference voltage detectors with each other by a plurality of comparators, respectively;
selecting the output voltage outputted from the secondary power supply whose difference in the absolute value from the reference voltage is the highest of all output voltages of the secondary power supplies based on comparison results of the comparators, by a selector; and
converting the output voltage selected by the selector into quantized voltage information by a converter.

* * * * *